(12) United States Patent
Tanaka et al.

(10) Patent No.: US 12,276,233 B2
(45) Date of Patent: Apr. 15, 2025

(54) ENGINE CONTROL DEVICE

(71) Applicant: DENSO CORPORATION, Kariya (JP)

(72) Inventors: Hidetake Tanaka, Kariya (JP);
Yasuhiro Shikata, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 18/476,007

(22) Filed: Sep. 27, 2023

(65) Prior Publication Data

US 2024/0026834 A1  Jan. 25, 2024

Related U.S. Application Data

(63) Continuation of application No. PCT/JP2022/010605, filed on Mar. 10, 2022.

(30) Foreign Application Priority Data

Mar. 30, 2021 (JP) ................. 2021-058793

(51) Int. Cl.
*F02D 41/00* (2006.01)

(52) U.S. Cl.
CPC ...... *F02D 41/0052* (2013.01); *F02D 41/0047* (2013.01); *F02D 2200/023* (2013.01); *F02D 2200/0611* (2013.01)

(58) Field of Classification Search
CPC .. F02D 19/08; F02D 19/084; F02D 2200/021; F02D 2200/023; F02D 2200/0611; F02D 41/005; F02D 41/0052; F02D 43/04; F02D 19/061; F02D 19/0634; F02D 19/0649; F02D 19/0671; F02D 19/0689; F02D 2041/389; F02D 35/023; F02D 35/027; F02D 37/02;

(Continued)

(56) References Cited

U.S. PATENT DOCUMENTS

2009/0150052 A1* 6/2009 Kumano ............... F02D 37/02
123/299
2010/0121559 A1* 5/2010 Bromberg ............ F02D 19/084
123/436

(Continued)

FOREIGN PATENT DOCUMENTS

| CN | 103033592 A | 4/2013 |
| CN | 111237066 A | 6/2020 |

(Continued)

*Primary Examiner* — Phutthiwat Wongwian
*Assistant Examiner* — Diem T Tran
(74) *Attorney, Agent, or Firm* — Nixon & Vanderhye P.C.

(57) ABSTRACT

An ECU includes: an index calculation unit calculating, as indices relating to fuel properties, a first index that indicates a degree of anti-knocking margin and a second index that indicates required ignition energy required for normal ignition; a first control unit for setting a target in-cylinder temperature based on the first index and controlling an in-cylinder temperature based on the target in-cylinder temperature, as an in-cylinder temperature control for controlling the in-cylinder temperature immediately before combustion; and a second control unit for setting a target EGR rate based on the second index and controlling an EGR rate based on the target EGR rate as an EGR control performed by an EGR device for controlling the EGR rate.

4 Claims, 6 Drawing Sheets

(58) Field of Classification Search
CPC ............... F02D 41/0025; F02D 41/009; F02D 41/1497; F02D 41/3035; F02D 41/3041; F02D 41/3064; F02D 41/3076; F02D 41/40; Y02T 10/30; F02M 27/02; F02P 5/1502; F02P 5/152
See application file for complete search history.

(56) References Cited

U.S. PATENT DOCUMENTS

| | | | |
|---|---|---|---|
| 2011/0100323 A1* | 5/2011 | Bradley | F02D 19/061 |
| | | | 123/304 |
| 2014/0196702 A1* | 7/2014 | Gingrich | F02D 35/02 |
| | | | 123/568.21 |

FOREIGN PATENT DOCUMENTS

| | | |
|---|---|---|
| JP | H09112395 A | 4/1997 |
| JP | 2000192846 A | 7/2000 |
| JP | 2009235908 A | 10/2009 |
| JP | 2014088779 A | 5/2014 |

\* cited by examiner

ENGINE CONTROL DEVICE

CROSS REFERENCE TO RELATED APPLICATION

The present application is a continuation application of International Patent Application No. PCT/JP2022/010605 filed on Mar. 10, 2022, which designated the U.S. and claims the benefit of priority from Japanese Patent Application No. 2021-058793 filed on Mar. 30, 2021. The entire disclosures of all of the above applications are incorporated herein by reference.

TECHNICAL FIELD

The present disclosure relates to an engine control device.

BACKGROUND

An EGR device has been used to reduce NOx emission of an internal combustion engine.

SUMMARY

According to an aspect of the present disclosure, an engine control device is applicable to an engine of a spark ignition type. The engine is equipped with an ignition device, which is configured to perform ignition in a cylinder, and an EGR device, which is configured to recirculate exhaust gas to an air intake passage. The engine is capable of using mixed fuel containing different types of fuel mixed with gasoline. The engine control device us configured to, on a premise that gasoline is used, control an in-cylinder temperature immediately before combustion and control an EGR rate of the EGR device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
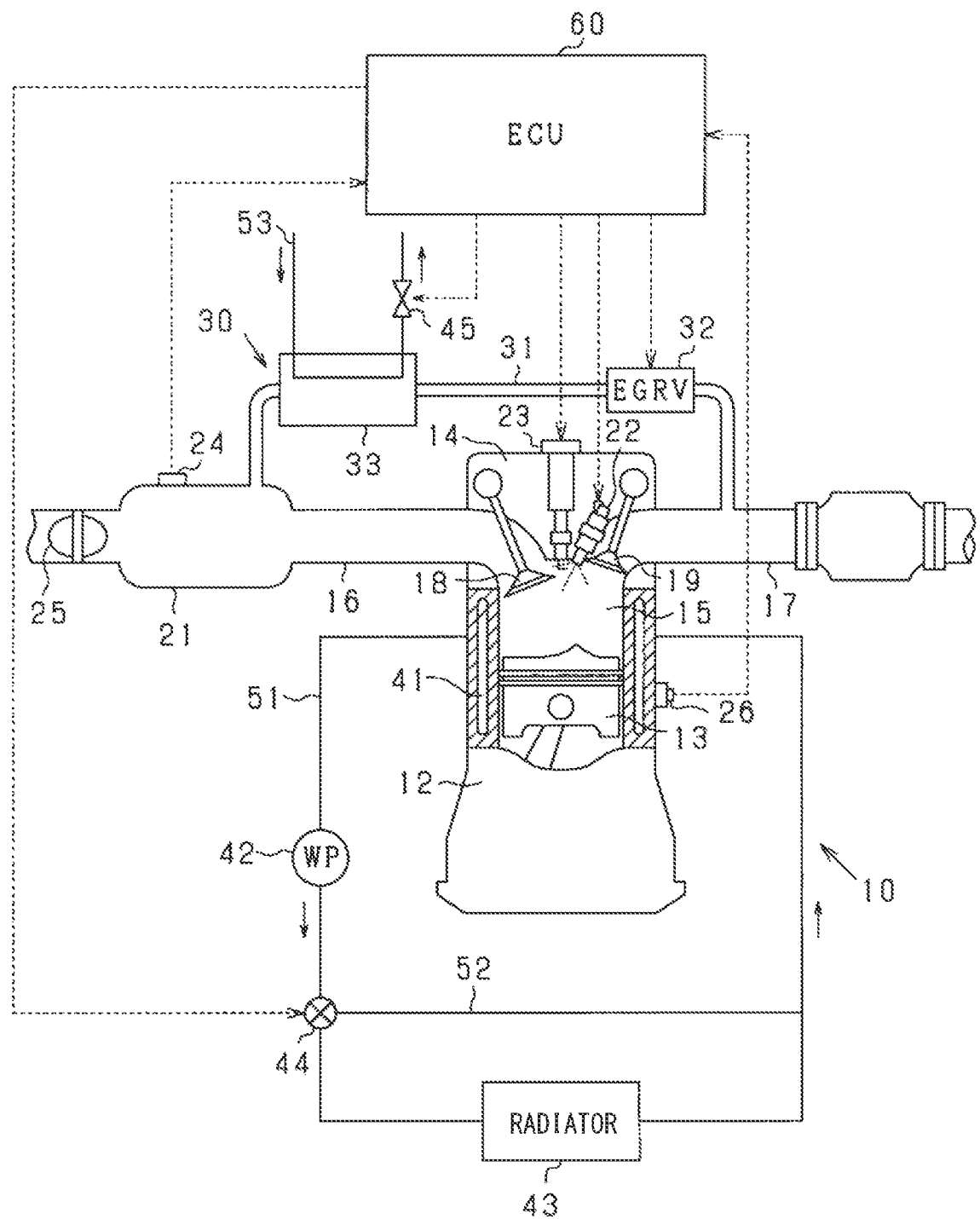
FIG. 1 is a configuration diagram of an outline of an engine control device.

Hereinafter, examples of the present disclosure will be described.

According to an example of the present disclosure, an EGR device returns exhaust gas emitted from an engine to an intake side and reuses the exhaust gas. In this way, the EGR device enables to reduce NOx emission by lowering a combustion temperature in a cylinder, while reducing pumping loss, thereby to improve fuel efficiency.

Further, according to an example, the higher a target EGR rate becomes, the higher a target coolant temperature is set. When the target EGR rate and the target coolant temperature fluctuate, the actual EGR rate is not immediately changed. Instead, the actual EGR rate is gradually changed in accordance with the change in the actual coolant temperature that follows the target coolant temperature. As a result, the combustion of the air-fuel mixture is prevented from becoming unstable while increasing the EGR rate as much as possible.

By the way, as an alternative fuel to gasoline, an alcohol-mixed fuel in which alcohol such as ethanol is mixed with gasoline and an alcohol fuel containing 100% alcohol are assumable. Alternative fuels have different properties from gasoline. As described above, it is possible to improve the fuel efficiency by implementing EGR. However, when the fuel properties are different, there is a concern that a sufficient fuel efficiency improvement effect cannot be obtained. Further, when the fuel properties are different, there is a concern that misfire may occur due to an excessive decrease in in-cylinder temperature due to fuel vaporization in the cylinder, and combustion fluctuations may increase.

According to an example of the present disclosure, an engine control device is appliable to a spark ignition type engine. The engine is equipped with an ignition device configured to perform ignition in a cylinder and an EGR device configured to recirculate exhaust gas to an air intake passage.

The engine control device includes:
an index calculation unit configured to calculate, as indices relating to fuel properties, a first index that indicates a degree of anti-knocking margin and a second index that indicates required ignition energy required for normal ignition;
a first control unit configured to perform an in-cylinder temperature control to control the in-cylinder temperature immediately before combustion, by setting a target in-cylinder temperature based on the first index and by controlling an in-cylinder temperature based on the target in-cylinder temperature; and
a second control unit configured to perform an EGR control of an EGR device by setting a target EGR rate based on the second index and by controlling an EGR rate based on the target EGR rate.

Fuels with different properties are considered to have (i) different margins in anti-knocking, which is an index for proper ignition while suppressing an occurrence of knocking, and (ii) different required ignition energy, which is an index for performing EGR while maintaining combustion stability. Further, in the engine, by controlling the state of the engine according to the margin of anti-knocking of the fuel and the required ignition energy, it is possible to improve combustion stability and improve fuel efficiency.

That is, when the degree of anti-knocking margin is different, an upper limit temperature that is allowed as the in-cylinder temperature also becomes different, which makes it possible, in a knocking suppressed state, to set a higher in-cylinder temperature as the degree of anti-knocking margin increases. By raising the in-cylinder temperature to a higher value, the combustion stability in the engine is improvable. Also, when the required ignition energy required for normal ignition differs in magnitude, an EGR limit on an upper limit side of the EGR rate differs, which makes it possible to set a higher EGR rate, because the EGR limit is settable to a greater value as the required ignition energy lowers. By increasing the EGR rate, the effect of improving fuel efficiency can be enhanced.

In this regard, in the present disclosure, the first index indicating the degree of anti-knocking margin and the second index indicating the required ignition energy are calculated as indices relating to fuel properties. In the in-cylinder temperature control for controlling the in-cylinder temperature immediately before combustion, the target in-cylinder temperature is set based on the first index, and the in-cylinder temperature is controlled based on the target in-cylinder temperature. Further, in the EGR control performed by the EGR device for controlling the EGR rate, the target EGR rate is set based on the second index, and the EGR rate is controlled based on the target EGR rate. In such case, the in-cylinder temperature control described above can improve the combustion stability by suppressing the occurrence of knocking and misfiring. Further, according to the above-described EGR control, the EGR rate is suitably increasable to improve fuel efficiency. As a result, it is possible to improve combustion stability and fuel efficiency when using fuels with different properties.

An engine control device of the present embodiment is applied to a spark ignition type multi-cylinder engine mounted on a vehicle. As shown in FIG. 1, an engine has a cylinder block 12 and a cylinder head 14, and a piston 13 is housed in each cylinder of the cylinder block 12 so as to be able to reciprocate. A combustion chamber is defined by an inner wall of the cylinder, the cylinder head 14, and the piston 13. The combustion chamber 15 communicates with an intake passage 16 via an intake valve 18, and communicates with an exhaust passage 17 via an exhaust valve 19. The cylinder head 14 is provided with an injector 22 that directly injects fuel into the combustion chamber 15 and a spark plug 23 that ignites the fuel mixture in the combustion chamber 15. Although not shown, a fuel supply system has a fuel tank and a fuel pump, and the fuel in the fuel tank is pressurized by the fuel pump, and the high pressure fuel is injected from the injector 22.

A surge tank 21 is arranged in the intake passage 16. The surge tank 21 is provided with an intake pressure sensor 24 that detects an intake pressure, which is the pressure in an intake pipe. A throttle valve 25 is provided upstream of the surge tank 21 in the intake passage 16. The exhaust passage 17 is provided with a catalyst such as a three-way catalyst for purifying CO, HC, NOx, etc. in the exhaust gas.

A water jacket 41 is provided in the cylinder block 12 and the cylinder head 14, and the engine 10 is cooled by circulating engine cooling water as a coolant in the water jacket 41. A water temperature sensor 26 for detecting the temperature of the engine cooling water is provided inside the water jacket 41. A circulation path 51 for engine cooling water is connected to the water jacket 41. A water pump 42, a radiator 43 and a flow path switching valve 44 are provided in the circulation path 51. The water pump 42 circulates the engine cooling water through the circulation path 51. The radiator 43 cools the engine cooling water by using the travel wind or the like when the vehicle travels. A detour path 52 is connected to the circulation path 51, and, by using the flow switching valve 44, a switching between two paths is performed, i.e., between (i) a flow path in which the engine cooling water circulates through the radiator 43, and (ii) a flow path in which the engine cooling water circulates through the detour path 52, or in other words, a flow path through which the engine cooling water circulates by bypassing the radiator 43.

The engine 10 is provided with an EGR device 30 that recirculates part of the exhaust gas to the intake side. The EGR device 30 has an EGR passage 31 that connects the exhaust passage 17 and the surge tank 21 of the intake passage 16, and the EGR passage 31 is provided with an EGR valve 32 and an EGR cooler 33. An opening of the EGR valve 32 adjusts an EGR rate, which is a mixing ratio of the exhaust gas in an inflow gas flowing into the combustion chamber 15.

The EGR cooler 33 is a water-cooled cooling device that cools the EGR gas using the engine cooling water, and the EGR gas is cooled therein by the engine cooling water flowing in a branch path 53 that branches from the circulation path 51. The branch path 53 is provided with a control valve 45 for adjusting the flow rate of the engine cooling water passing through the EGR cooler 33, and the degree of cooling of the EGR gas is adjusted by the degree of opening of the control valve 45.

An ECU 60 is an electronic control unit mainly composed of a microcomputer including a CPU, a ROM, a RAM and the like, as is well known, and executes various control programs stored in the ROM to perform various controls of the engine 10 in accordance with each of engine operation states. Specifically, the ECU 60 receives various detection signals from the intake pressure sensor 24, a rotation speed sensor (not shown), etc., and controls the operations of the injector 22 and the spark plug 23 based on the detection signals.

In order to improve the combustion stability of the engine 10, the ECU 60 performs (a) an in-cylinder temperature control that controls the in-cylinder temperature (inside the combustion chamber 15) immediately before combustion, and (b) an EGR control that controls the EGR rate by the EGR device 30. In the present embodiment, the in-cylinder temperature control is performed by controlling the temperature of the engine cooling water (that is, by controlling engine water temperature), and by increasing the engine water temperature, the in-cylinder temperature is increased. Specifically, the ECU 60 sets a target water temperature, and controls the flow path switching valve 44 and the water pump 42 so that the actual water temperature matches the target water temperature. For example, the target water temperature is set based on a requested torque of the engine 10, and the higher the torque, the lower the temperature is set. In such case, for example, when the engine water temperature is increased, the ECU 60 controls the flow path switching valve 44 to cause the engine cooling water to bypass the radiator 43 or reduce the flow rate of the engine cooling water flowing into the radiator 43. Let Alternatively, it is possible to increase the engine water temperature by reducing the amount of engine cooling water pumped by the water pump 42.

As an in-cylinder temperature control, it is also possible to control the temperature of the intake air flowing into the combustion chamber 15. Specifically, the ECU 60 sets the target intake air temperature and controls the temperature of the EGR gas by adjusting the degree of cooling by the EGR cooler 33 so that the intake air temperature matches the target intake air temperature. For example, the target intake air temperature is set based on the requested torque of the engine 10, and the higher the torque, the lower the temperature is set. In such case, for example, when increasing the intake air temperature, the ECU 60 controls the control valve 45 to reduce the amount of engine cooling water flowing through the branch path 53 to reduce the degree of cooling of the EGR gas by the EGR cooler 33.

Further, as EGR control, the ECU 60 also controls the EGR rate by controlling the opening of the EGR valve 32 based on the requested torque of the engine 10. Specifically, (A) when the engine is in a medium load operating state and the requested torque is moderate, the target EGR rate is increased to perform EGR control, and (B) when the engine is in a low load operating state or a high load operating state and the requested torque is low or high, the target EGR rate is lowered to perform EGR control.

In the present embodiment, other than gasoline, it is possible to use, in the engine 10, an alcohol-mixed fuel in which an alcohol such as ethanol is mixed with gasoline, and it is configured to perform an in-cylinder temperature control and an EGR control according to the fuel properties of the fuel being actually used at the moment. Specifically, if the fuel properties are different, the margin of anti-knocking and the required ignition energy required for normal ignition are also different. Therefore, it is conceivable to use (i) an index (first index) indicating a degree of anti-knocking margin (i.e., may hereafter be simplified to an anti-knocking margine) and (ii) an index (second index) indicating the required ignition energy required for normal ignition for performing an in-cylinder temperature control and an EGR control.

However, in the present embodiment, the EGR limit is calculated as an index indicating the required ignition energy, focusing on the fact that the required ignition energy serving as an index related to fuel properties has a correlation with the EGR limit, which is the limit value on the upper limit side of the EGR rate. In such case, the required ignition energy and the EGR limit have a relationship such that the smaller the required ignition energy is, the larger the EGR limit becomes, and conversely, the larger the required ignition energy is, the smaller the EGR limit becomes. The ECU 60 calculates an anti-knocking margin A and an EGR limit B as indices relating to fuel properties, and performs an in-cylinder temperature control and an EGR control based on these indices A and B.

A procedure for calculating each of the indices relating to fuel properties is described below with reference to the flowchart of FIG. 2. The processing of FIG. 2 is repeatedly performed by the ECU 60 at predetermined intervals.

Figure 2:
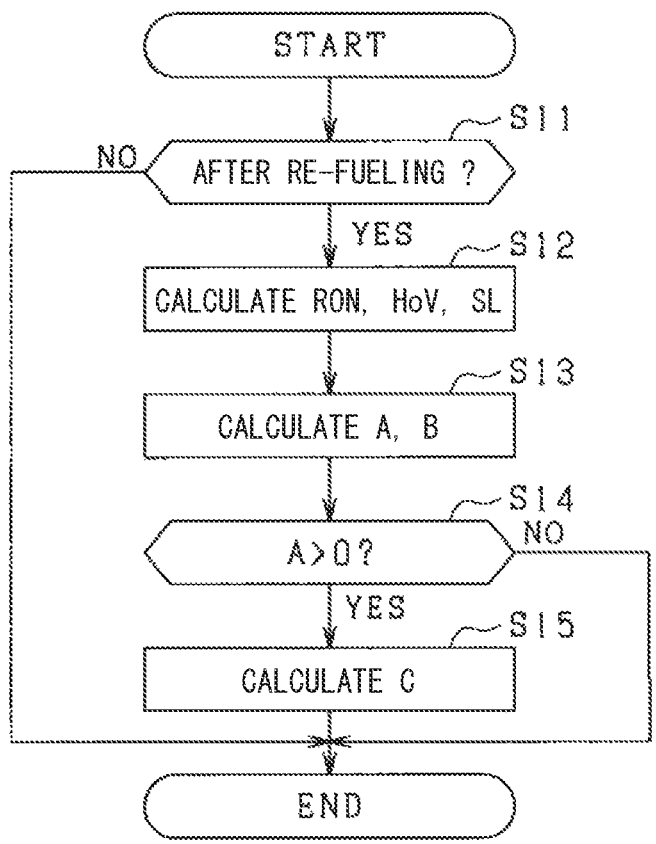
FIG. 2 is a flowchart of a procedure for calculating each of indices related to fuel properties.

In FIG. 2, in step S11, it is determined whether or not the fuel tank has just been refueled. This determination may be made based on, for example, the information received from the refueling facility, the detection information of the fuel amount sensor in the fuel tank, the opening/closing information of the refueling port, and the like. When it is a timing immediately after refueling, the process proceeds to step S12, and when it is not immediately after refueling, this process ends.

In step S12, as property values of the fuel to be used, an octane number RON1, which indicates the resistance to knocking, a latent heat of vaporization HoV1, which is the amount of heat absorbed when the fuel changes from liquid to gas, and a laminar combustion rate SL1, which indicates the speed of flame propagation to the unburned air-fuel mixture are calculated. In such case, the type of fuel remaining in the fuel tank and the type of fuel newly supplied may be different, thereby it is preferable that a property value of post-refueling fuel is calculated based on the property value of the remaining fuel and the property value of the refueled fuel.

Here, as the fuel in the fuel tank other than gasoline, it is assumed that an alcohol-mixed fuel in which alcohol such as ethanol is mixed with gasoline is used, and an alcohol concentration Xnew of the fuel in the fuel tank after refueling is calculated based on an alcohol concentration Xold of the fuel remaining in the fuel tank and an alcohol concentration Xadd of the newly supplied fuel. The alcohol concentration Xnew may be calculated using Equation 1 below.
Xnew=(Xold×Vold+Xadd×Vadd)/(Vold+Vadd) (Equation 1)
In Equation 1, Vold is the remaining fuel amount in the fuel tank before refueling, and Vadd is the added fuel amount added by refueling. Note that the alcohol concentration Xadd and the added fuel amount Vadd regarding the added fuel may be obtained, for example, from a refueling facility through communication or the like.

Figure 3:
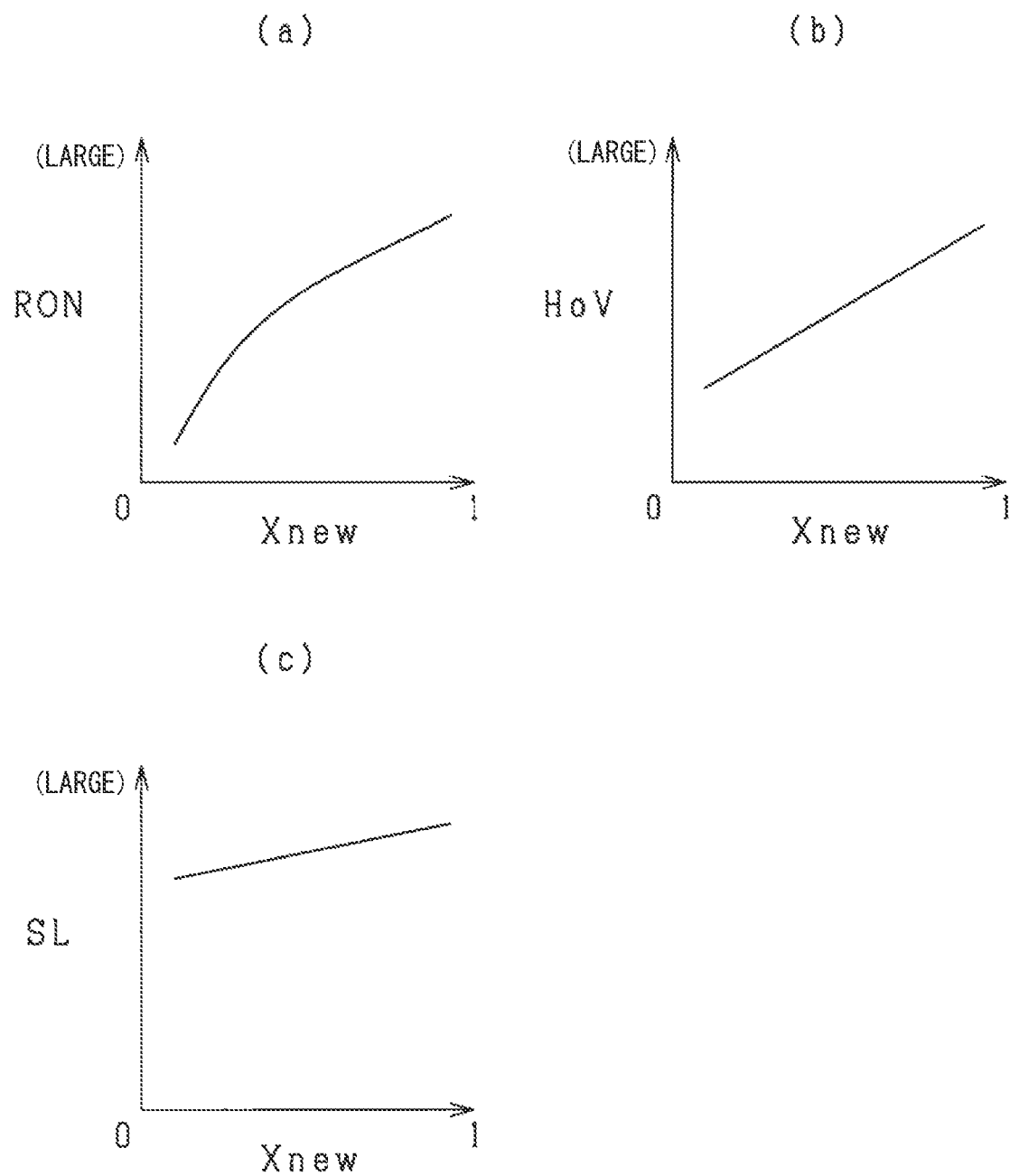
FIG. 3 are diagrams including (a), which is a diagram of a relationship between alcohol concentration and an octane number, (b), which is a diagram of a relationship between alcohol concentration and latent heat of vaporization, and (c), which is a diagram of a relationship between alcohol concentration and laminar combustion rate.

Then, the octane number RON1, the latent heat of vaporization HoV1, and the laminar combustion rate SL1 are calculated as fuel property values for the fuel after repfueling, taking into consideration the alcohol concentration Xnew. Specifically, the octane number RON1 is calculated using the relationship in (a) in FIG. 3. The latent heat of vaporization HoV1 is calculated using the relationship in (b) in FIG. 3. The laminar combustion rate SL1 is calculated using the relationship in (c) in FIG. 3. According to (a) to (c) in FIG. 3, the higher the alcohol concentration Xnew is, the higher the calculated octane number RON1, the latent heat of vaporization HoV1, and the laminar combustion rate SL1 respectively become.

Thereafter, in step S13, based on the octane number RON1, the latent heat of vaporization HoV1, and the laminar combustion rate SL1, the anti-knocking margin A and the EGR limit B based on gasoline are calculated.

Regarding the calculation of the anti-knocking margin A, more specifically, a difference ARON between an octane number RON0 of gasoline and the octane number RON1 of the fuel to be used is calculated with reference to the octane number RON0 of gasoline. Then, using the relationship shown in (a) in FIG. 4, the anti-knocking margin A is calculated based on the octane number difference ARON and the latent heat of vaporization HoV1 of the fuel used. At this time, the greater the octane number difference ARON is, the greater the anti-knocking margin A becomes. Further, the greater the latent heat of vaporization HoV1 is, the greater the temperature drop in the cylinder becomes, resulting in the greater anti-knocking margin A. That is, the higher the alcohol concentration Xnew of the fuel to be used is, the higher the octane number difference ARON and the latent heat of vaporization HoV1 become, thereby increasing the anti-knocking margin A.

Regarding the calculation of the EGR limit B, specifically, a difference ΔSL between a laminar combustion rate SL0 of gasoline and the laminar combustion rate SL1 of the fuel to be used is calculated based on the laminar combustion rate SL0 of gasoline. Then, using the relationship shown in (b) in FIG. 4, the EGR limit B is calculated based on the difference ΔSL between the laminar combustion rates SL and the latent heat of vaporization HoV1 of the fuel used. At this time, as the difference ΔSL between the laminar combustion rates SL increases, the EGR limit B increases because the combustibility improves. Also, the smaller the latent heat of vaporization HoV1 is, the smaller the temperature drop in the cylinder becomes, and the worsening of combustibility is suppressed, thereby EGR limit B becomes larger.

In step S14, it is determined whether or not the anti-knocking margin A is greater than zero. The fact that the anti-knocking margin A is greater than 0 means that the fuel currently being used has an anti-knocking margin A greater than that of gasoline. When the anti-knocking margin A is greater than 0, the process proceeds to step S14. When the anti-knocking margin A is not greater than 0, this process ends.

In step S15, an EGR limit extended amount C associated with the increase in the anti-knocking margin A is calculated. The EGR limit extended amount C is an increase width by which the upper limit value of the EGR rate is extended to the increase side in accordance with the increase of the in-cylinder temperature when the in-cylinder temperature can be increased as the anti-knocking margin A is increased. In this step S15, for example, using the relationship shown in (c) in FIG. 4, the increase amount ΔT in the in-cylinder temperature is calculated based on the anti-knocking margin A, and, using the relationship shown, for example, in (d) in FIG. 4, the EGR limit extended amount C is calculated based on the increase amount ΔT of the in-cylinder temperature. In such case, the larger the anti-knocking margin A is, the larger the increase amount ΔT in the in-cylinder temperature is calculated. Further, the EGR limit extended amount C is calculated to be a larger value as the increase amount ΔT of the in-cylinder temperature increases.

Figure 4:
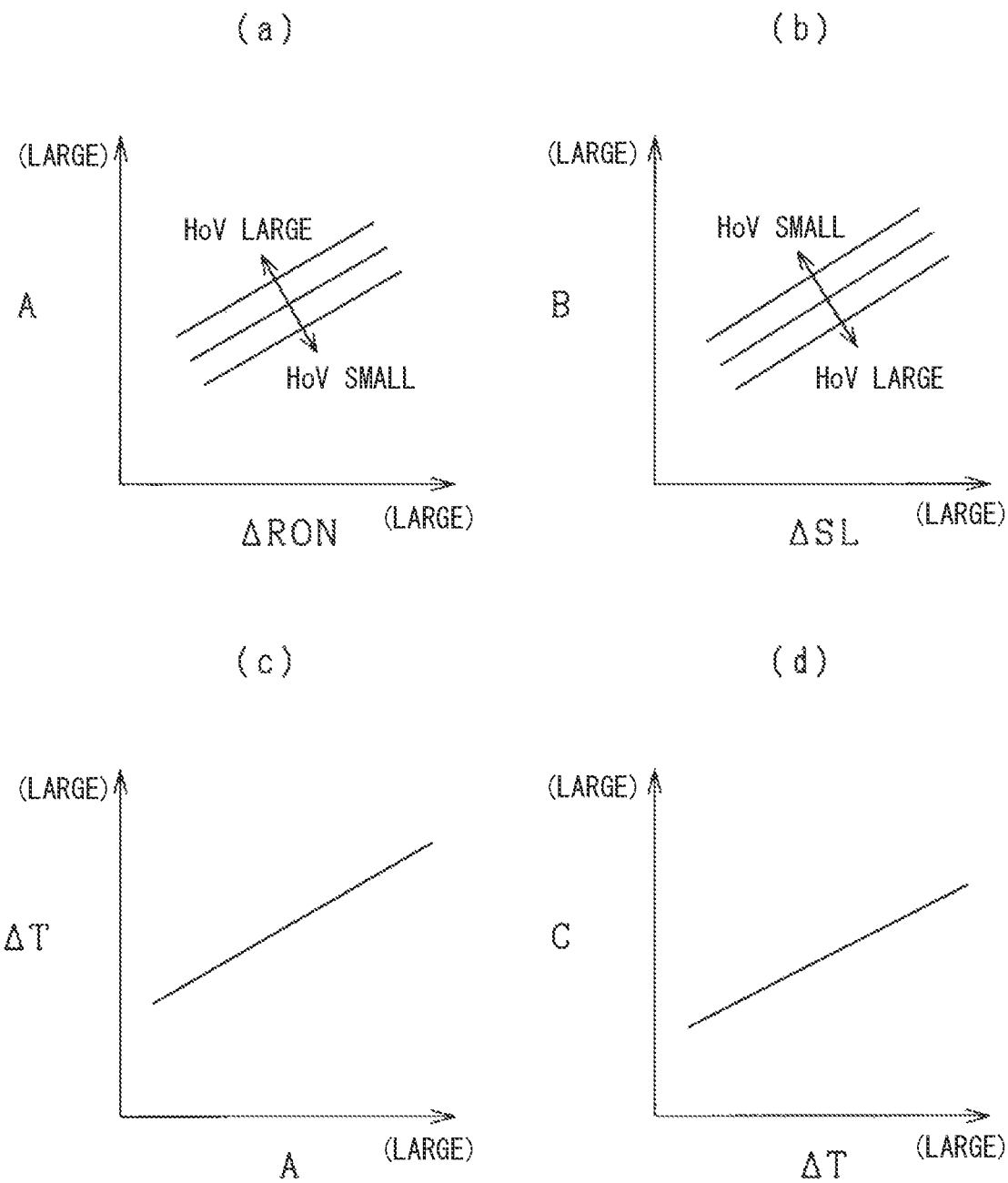
FIG. 4 are diagrams including (a), which is a diagram of a relationship for determining a degree of anti-knocking margin, (b), which is a diagram of a relationship for determining an EGR limit, (c), which is a diagram of a relationship between an amount of increase in in-cylinder temperature, and (d), which is a diagram of a relationship among EGR limit extended amounts.

It is also possible to combine the relationships of (c) and (d) in FIG. 4 into one and calculate the EGR limit extended amount C based on the anti-knocking margin A.

Next, an in-cylinder temperature control and an EGR control using each of the indices relating to fuel properties are described in detail.

In the present embodiment, gasoline is used as a reference fuel, and it is determined (i) whether or not the anti-knocking margin A deviates from gasoline by a predetermined amount or more, and (ii) whether or not the EGR limit B deviates from gasoline by a predetermined amount or more, and, based on these determination results, an in-cylinder temperature control based on a target in-cylinder temperature different from that when gasoline is used and an EGR control based on a target EGR rate different from that when gasoline is used are selectively performed. More specifically, the ECU 60 selectively performs (a) an in-cylinder temperature control to make the target in-cylinder temperature higher than when gasoline is used and (b) an EGR control to make the target EGR rate higher than when gasoline is used, based on (i) a determination result of whether or not the anti-knocking margin A is greater than that of gasoline, and (ii) a determination result of whether or not the EGR limit B is greater than that of gasoline.

Further, when it is determined that the anti-knocking margin A is larger than that of gasoline and that the EGR limit B is not greater than that of gasoline, the ECU 60 determines, based on the EGR limit B and the EGR limit extended amount C, whether or not an EGR control that makes the target EGR rate higher than when gasoline is used is performable.

Figure 5:
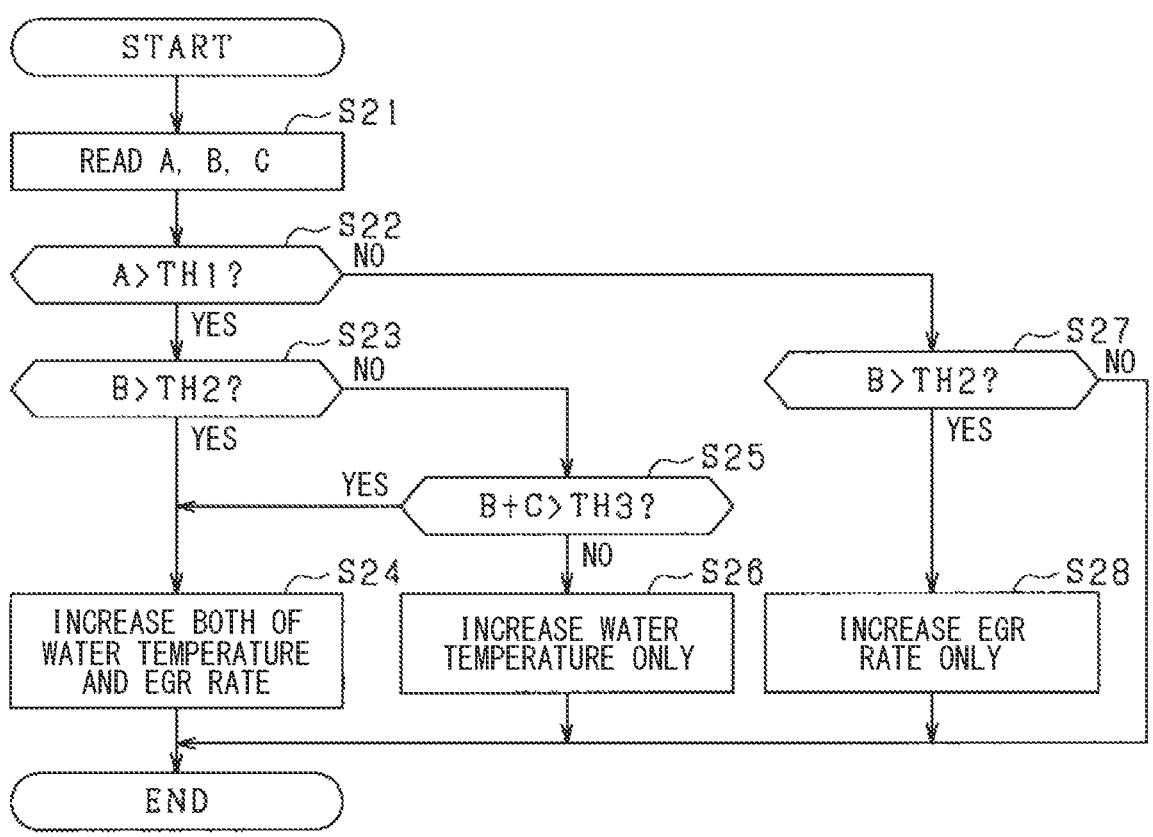
FIG. 5 is a flowchart of a procedure for in-cylinder temperature control and EGR control using each of indices relating to fuel properties.

FIG. 5 is a flowchart of a procedure for an in-cylinder temperature control and an EGR control using each of the indices relating to fuel properties. This process is repeatedly performed by the ECU 60 at a predetermined cycle.

In step S21, the anti-knocking margin A, the EGR limit B, and the EGR limit extended amount C of the fuel currently in use are read.

Thereafter, in step S22, it is determined whether or not the anti-knocking margin A is greater than a first reference TH1, and, in step S23, it is determined whether or not the EGR limit B is greater than a second reference TH2. When both steps S22 and S23 are affirmative, the process proceeds to step S24. When both steps S22 and S23 are affirmative, it means that the anti-knocking margin A is greater than that of gasoline and the EGR limit B is greater than that of gasoline.

Figure 6:
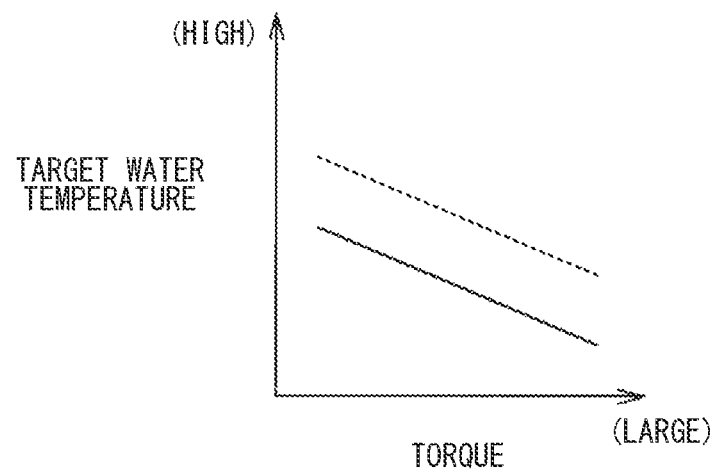
FIG. 6 is a diagram of a relationship between a target water temperature and a torque.

In step S24, (a) an in-cylinder temperature control that makes the target in-cylinder temperature higher than that when gasoline is used according to the anti-knocking margin A, and (b) an EGR control that makes the target EGR rate higher than that when gasoline is used according to the EGR limit B and the EGR limit extended amount C are both performed. Here, when an engine water temperature control is performed as the in-cylinder temperature control, the target water temperature is set using the relationship shown in FIG. 6. In FIG. 6, a solid line indicates the target water temperature for the water temperature control when gasoline is used, and a broken line indicates the target water temperature when the anti-knocking margin A is greater than that of gasoline. In such case, the target water temperature is set to a higher temperature as the anti-knocking margin A increases with gasoline as a reference.

Figure 7:
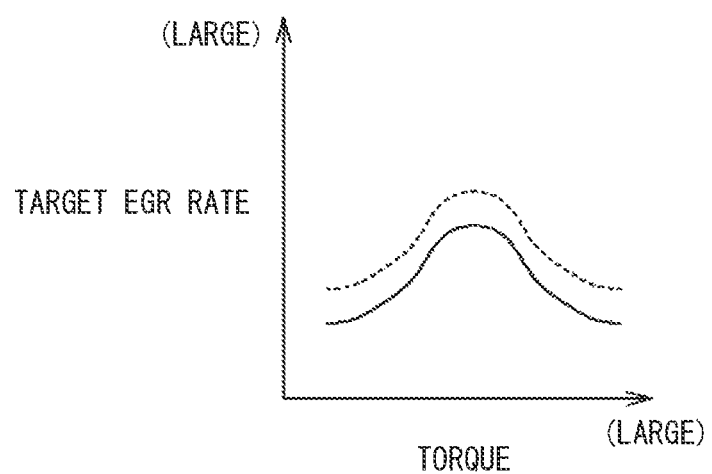
FIG. 7 is a diagram of a relationship between a target EGR rate and a torque.

Also, in the EGR control, the target EGR rate is set using the relationship shown in FIG. 7. In FIG. 7, a solid line indicates the target EGR rate for the EGR control when gasoline is used, and a broken line indicates the target EGR rate when the EGR limit B is greater than that of gasoline. The target EGR rate indicated by the broken line is determined based on the sum of the EGR limit B and the EGR limit extended amount C. In such case, the greater the EGR limit B is with reference to gasoline, the higher the target EGR rate is set. Incidentally, as described above, the EGR limit B is correlated with the required ignition energy, and in terms of the relationship between the required ignition energy and the target EGR rate, the smaller the required ignition energy on the basis of gasoline, the higher the target EGR rate is set.

In FIG. 6, when the anti-knocking margin A is greater than that of gasoline, the target water temperature is raised in a constant width regardless of the requested torque of the engine. However, the water temperature may be variably raised according to the requested torque. In FIG. 7, when the EGR limit B is greater than that of gasoline, the target EGR rate is increased in a constant width regardless of the requested torque of the engine. However, the water temperature may be variably raised according to the requested torque.

When step S22 is affirmative and step S23 is negative, the process proceeds to step S25. In step S25, it is determined whether or not the sum of the EGR limit B and the EGR limit extended amount C is greater than a third reference TH3. In other words, the determination in step S25 is made when the anti-knocking margin A is greater than that of gasoline and the EGR limit B is not greater than that of gasoline.

When step S25 is affirmative, the process proceeds to step S24. In step S24, as described above, the in-cylinder temperature control that makes the target in-cylinder temperature greater than when gasoline is used according to the anti-knocking margin A, and the EGR control that makes the target EGR rate higher than that when gasoline is used according to the EGR limit B and the EGR limit extended amount C are both performed.

Moreover, when step S25 is negative, the process proceeds to step S26. In step S26, only the in-cylinder temperature control is performed, among (a) the in-cylinder temperature control to make the target in-cylinder temperature higher than when gasoline is used and (b) the EGR control to make the target EGR rate higher than when gasoline is used. In such case, using the relationship shown in FIG. 6, the target water temperature is set based on the anti-knocking margin A, and the engine water temperature is controlled based on the target water temperature.

That is, in step S25, when it is determined (a) that the anti-knocking margin A is greater than that of gasoline and (b) that the EGR limit B is not greater than that of gasoline (when step S22 is YES and step S23 is NO), based on the EGR limit B and the EGR limit extended amount C, it is determined whether or not the EGR control to make the target EGR rate higher than when gasoline is used is performable. Then, the EGR control is performed only when the EGR control that makes the target EGR rate higher than when gasoline is determined as performable (step S24).

Here, in step S26, since the EGR limit B is equal to or less than TH2, and B+C is equal to or less than TH3, the target EGR rate is not set higher than when gasoline is used. In such case, since the required ignition energy is greater than that of gasoline and the EGR limit extended amount C is not so great, there is concern that misfiring may occur due to an increase in the EGR rate. In consideration of the above, the target EGR rate is set not to be higher than when gasoline is used, thereby the occurrence of combustion fluctuations due to the occurrence of misfires is suppressed.

When step S22 is negative, it is determined in step S27 whether the EGR limit B is greater than the second reference TH2. If step S27 is affirmative, the process proceeds to step S28. In step S28, in-cylinder temperature control is performed to make the target in-cylinder temperature higher than when gasoline is used, and EGR control is performed to make the target EGR rate higher than when gasoline is used. Of these, only EGR control is performed. In such case, using the relationship shown in FIG. 7, a target EGR rate is set based on the EGR limit B, and EGR control is performed based on the target EGR rate.

If step S22 is denied and step S27 is affirmative, it means that the anti-knocking margin A is not greater than that of gasoline and the EGR limit B is greater than that of gasoline. In such case, there is concern that knocking may occur due to the increase in the target water temperature. In consideration of the above, in step S28, the target EGR rate is set higher than when gasoline is used, but the target water temperature is not set higher than when gasoline is used, thereby knocking is suppressed while the EGR rate is increased as much as possible.

When both steps S22 and S27 are negative, the process ends. In such case, it is assumed that the fuel used is gasoline, thereby the in-cylinder temperature control and the EGR control when gasoline is used are respectively performed.

According to the present embodiment described in detail above, the following excellent effects are achievable.

As indices relating to fuel properties, an anti-knocking margin A and an EGR limit B (an index indicating required ignition energy) are calculated. Then, in the in-cylinder temperature control for controlling the in-cylinder temperature immediately before combustion, a target in-cylinder temperature is set based on the anti-knocking margin A, and the in-cylinder temperature is controlled based on the target in-cylinder temperature. Further, in the EGR control for controlling the EGR rate by the EGR device 30, the target EGR rate is set based on the EGR limit B, and the EGR rate is controlled based on the target EGR rate. In such case, the in-cylinder temperature control described above can improve the combustion stability by suppressing the occurrence of knocking and misfiring. Further, according to the above-described EGR control, the EGR rate is suitably increasable to improve fuel efficiency. As a result, it is possible to improve combustion stability and fuel efficiency when using fuels with different properties.

Since (a) the higher the octane number RON1 of fuel is, the less likely knocking will occur, and (b) the higher the latent heat of vaporization HoV1 of fuel is, the less likely knocking will occur, the anti-knocking margin A is calculable based on the octane number RON1 and the latent heat of vaporization HoV1. Further, since (c) the EGR limit B increases (the required ignition energy decreases) as the laminar combustion rate SL1 of the fuel used increases, and (d) the EGR limit B increases as the latent heat of vaporization HoV1 of the fuel decreases, the required ignition energy (EGR limit B) is calculable based on the laminar combustion rate SL1 and the latent heat of vaporization HoV1.

The target in-cylinder temperature is set to a higher value as the anti-knocking margin A is greater, and the target EGR rate is set to a higher value as the required ignition energy is smaller. As a result, the target in-cylinder temperature can be appropriately set according to the anti-knocking margin A, and the target EGR rate can be appropriately set according to the required ignition energy.

Using gasoline as a reference fuel, it is determined (a) that the anti-knocking margin A deviates from gasoline by a predetermined amount or more, and (b) that the EGR limit B, which correlates with the required ignition energy, deviates from gasoline by a predetermined amount or more, and, based on the those determination results, the in-cylinder temperature control with a target in-cylinder temperature different from that when gasoline is used and the EGR control with a target EGR rate different from that when gasoline is used are selectively performed. As a result, the in-cylinder temperature control and the EGR control can be appropriately performed according to the fuel properties of the fuel actually being used.

In an engine that uses gasoline as a reference fuel, it is conceivable that a mixed fuel in which a different kind of fuel such as alcohol is mixed with gasoline is used. Then, regarding the fuel used in the engine 10, it is determined (a) that the anti-knocking margin A is greater than that of gasoline, and (b) that the EGR limit B is greater than that of gasoline (in other words, that the required ignition energy is smaller than that of gasoline), and, based on these determination results, the in-cylinder temperature control that makes the target in-cylinder temperature higher than when gasoline is used and the EGR control that makes the target EGR rate higher than when gasoline is used are selectively performed. As a result, the in-cylinder temperature control and the EGR control can be appropriately performed even when different types of fuel are mixed with gasoline.

When it is determined (a) that the anti-knocking margin A is greater than that of gasoline and (b) that the EGR limit B is not greater than that of gasoline (in other words, the required ignition energy is not less than that of gasoline), it is determined whether or not to the EGR control is performable for increasing the target EGR rate greater than when gasoline is used based on the EGR limit B and the EGR limit extended amount C determined according to the anti-knocking margin A. In such case, when the anti-knocking margin A is greater than that of gasoline, it is possible to increase the upper limit of the EGR rate (that is, to extend the EGR limit) in accordance with the margin A. Therefore, even when the EGR limit B is not greater than that of gasoline, it is possible to set the target EGR rate higher than when gasoline is used, in anticipation that the upper limit of the EGR rate will increase according to the anti-knocking margin A. As a result, a fuel efficiency improvement effect is obtainable.

Other Embodiments

The above embodiment may be modified as follows, for example.

In the above embodiment, when it is determined that the anti-knocking margin A is greater than that of gasoline and that the EGR limit B is not greater than that of gasoline (that is, step S22 in FIG. 5 is YES, step S23 is NO), it is then determined (step S25) whether or not the EGR control to make the target EGR rate higher than when gasoline is used is performable, based on the EGR limit B and the EGR limit extended amount C. However, such determination may be omissible. In such case, when it is determined that the anti-knocking margin A is greater than that of gasoline and that the EGR limit B is not greater than that of gasoline, from among the in-cylinder temperature control in which the target in-cylinder temperature is set higher than when gasoline is used and the EGR control that makes the target EGR rate higher than when gasoline is used, only the in-cylinder temperature control is performed.

In the above embodiment, the octane number RON1, the latent heat of vaporization HoV1, and the laminar combustion rate SL1 are calculated as the fuel property values while considering the alcohol concentration Xnew after refueling, and, based on these fuel property values, the anti-knocking margin A and the EGR limit B are calculated by using gasoline as the standard. However, such scheme may be changed. Specifically, (a) the relationship between the alcohol concentration Xnew and the anti-knocking margin A and (b) the relationship between the alcohol concentration Xnew and the EGR limit B are stored in advance in a map or the like, and the anti-knocking margin A and the EGR limit B may be calculated directly from the alcohol concentration Xnew.

The present disclosure can be applied not only to engines for vehicles but also to engines other than vehicles.

The controller and method thereof described in the present disclosure may be realized by a dedicated computer including a processor programmed to execute one or more functions embodied by a computer program and a memory. Alternatively, the controller and the method described in the present disclosure may also be realized by a dedicated computer provided by configuring a processor with one or more dedicated hardware logic circuits. Alternatively, the controller and the method described in the present disclosure may also be realized by one or more dedicated computers, which are configured as a combination of (i) a processor and a memory, which are programmed to perform one or more functions, and (ii) a processor which is configured with one or more hardware logic circuits. The computer program may be stored in a computer-readable, non-transitory, tangible recording medium as an instruction to be performed by the computer.

Although the present disclosure has been made in accordance with the embodiments, it is understood that the present disclosure is not limited to such embodiments and structures. The present disclosure incorporates various modifications and variations within the scope of equivalents. Further, various combinations and forms, and other combinations and forms including only one element, more, or less than them are also included in the scope and concept of the present disclosure.

What is claimed is:

1. An engine control device applicable to an engine of a spark ignition type, the engine being equipped with an ignition device, which is configured to perform ignition in a cylinder, and an EGR device, which is configured to recirculate exhaust gas to an air intake passage, the engine being configured to use a mixed fuel containing different types of fuel mixed with gasoline, the engine control device configured to, on a premise that gasoline is used, control an in-cylinder temperature immediately before combustion and control an EGR rate of the EGR device, the engine control device comprising:

an index calculation unit configured to calculate, as indices relating to a fuel property, a first index, which indicates a degree of anti-knocking margin, and a second index, which indicates a required ignition energy required for normal ignition;

a first determination unit configured to determine that the degree of anti-knocking margin, as the first index, deviates from a degree of anti-knocking margin in a case where gasoline is used;

a second determination unit configured to determine that the required ignition energy, as the second index, deviates from a required ignition energy in a case where gasoline is used;

a first control unit configured to
set a target in-cylinder temperature based on the first index and
control the in-cylinder temperature based on the target in-cylinder temperature to perform an in-cylinder temperature control to control the in-cylinder temperature immediately before combustion; and a second control unit configured to
set a target EGR rate based on the second index and
control the EGR rate based on the target EGR rate to perform an EGR control to control the EGR rate of the EGR device, wherein the engine control device is configured to, based on a determination result of the first determination unit and a determination result of the second determination unit, selectively
perform the in-cylinder temperature control to increase the target in-cylinder temperature to more than a target in-cylinder temperature in a case where gasoline is used and
perform the EGR control to increase the target EGR rate to more than a target EGR rate in a case where gasoline is used, and the engine control device is configured to, when the first determination unit determines that the degree of anti-knocking margin is greater than the degree of anti-knocking margin in a case where gasoline is used, and when the second determination unit determines that the required ignition energy is not smaller than the required ignition energy in a case where gasoline is used,
determine whether the EGR control, which is to set the target EGR rate higher than the target EGR rate in a case where gasoline is used, is performable based on an EGR limit, which is an upper limit value of the EGR rate determined according to the required ignition energy, and an EGR limit extended amount, which determined according to the degree of the anti-knocking margin.

2. The engine control device of claim 1, further comprising:
an acquisition unit configured to acquire an octane number of fuel, a latent heat of vaporization of fuel, and a laminar combustion rate of fuel, wherein
the index calculation unit is configured to
calculate the first index based on the octane number and the latent heat of vaporization acquired by the acquisition unit, and
calculate the second index based on the latent heat of vaporization and the laminar combustion rate of fuel acquired by the acquisition unit.

3. The engine control device of claim 1, wherein
the first control unit is configured to set the target in-cylinder temperature to a higher temperature, as the degree of anti-knocking margin, as the first index, becomes higher, and
the second control unit is configured to set the target EGR rate to a higher value, as the required ignition energy, as the second index, becomes smaller.

4. An engine control device applicable to an engine, the engine equipped with an ignition device, which is configured to perform ignition in a cylinder, and an EGR device, which is configured to recirculate exhaust gas to an air intake passage, the engine configured to use a mixed fuel containing different types of fuel mixed with gasoline, the engine control device configured to, on a premise that gasoline is used, control an in-cylinder temperature immediately before combustion and control an EGR rate of the EGR device, the engine control device comprising:
a processor configured to
calculate, as indices relating to a fuel property, a first index, which indicates a degree of anti-knocking margin, and a second index, which indicates a required ignition energy required for normal ignition;
determine that the degree of anti-knocking margin deviates from a degree of anti-knocking margin in a case where gasoline is used;
determine that the required ignition energy deviates from a required ignition energy in a case where gasoline is used;
set a target in-cylinder temperature based on the first index and control the in-cylinder temperature based on the target in-cylinder temperature to perform an in-cylinder temperature control to control the in-cylinder temperature immediately before combustion;
set a target EGR rate based on the second index and control the EGR rate based on the target EGR rate to perform an EGR control to control the EGR rate of the EGR device;
selectively perform the in-cylinder temperature control to increase the target in-cylinder temperature to more than a target in-cylinder temperature in a case where gasoline is used and perform the EGR control to increase the target EGR rate to more than a target EGR rate when in a case where gasoline is used, based on a determination result of the degree of anti-knocking margin and a determination result of the required ignition energy; and
determine, on determination that the degree of anti-knocking margin is greater than the degree of anti-knocking margin in a case where gasoline is used, and on determination that the required ignition energy is not smaller than the required ignition energy in a case where gasoline is used, whether the EGR control, which is to set the target EGR rate higher than the target EGR rate in a case where gasoline is used, is performable based on an EGR limit, which is an upper limit value of the EGR rate determined according to the required ignition energy, and an EGR limit extended amount, which determined according to the degree of the anti-knocking margin.

* * * * *